(12) United States Patent
Wakabayashi (10) Patent No.: US 8,295,959 B2
(45) Date of Patent: Oct. 23, 2012

(54) SOUND-RECORDING APPARATUS

(75) Inventor: Eiji Wakabayashi, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 429 days.

(21) Appl. No.: 12/578,230

(22) Filed: Oct. 13, 2009

(65) Prior Publication Data

US 2010/0100209 A1     Apr. 22, 2010

(30) Foreign Application Priority Data

Oct. 17, 2008  (JP) ................................ 2008-268991

(51) Int. Cl.
*G06F 17/00*     (2006.01)

(52) U.S. Cl. .......................................... 700/94; 381/91

(58) Field of Classification Search ................... 700/94; 381/26, 87, 91

See application file for complete search history.

(56) References Cited

U.S. PATENT DOCUMENTS

| | | | |
|---|---|---|---|
| 6,421,444 B1* | 7/2002 | Van Schyndel | 379/433.01 |
| 2001/0011993 A1* | 8/2001 | Saarinen | 345/156 |
| 2005/0164734 A1* | 7/2005 | Kakuguchi | 455/556.1 |
| 2006/0060762 A1* | 3/2006 | Chan et al. | 250/221 |

FOREIGN PATENT DOCUMENTS

JP     2005-176063 A     6/2005

* cited by examiner

*Primary Examiner* — Walter F Briney, III (74) *Attorney, Agent, or Firm* — Westerman, Hattori, Daniels & Adrian, LLP (57) ABSTRACT

There is provided in a substantially rectangular sound-recording apparatus including: two first audio acquirers to which audio is stereophonically inputted; a second audio acquirer to which audio is monophonically inputted; and a supporter for holding the sound-recording apparatus in a predetermined attitude, in which the first and second audio acquirers are placed on different surfaces, and the two first audio acquirers are placed at both ends of a longer side of the main body, a sound-recording apparatus including an opening and closing sensor for sensing an opened and closed state of the supporter, and an attitude sensor for sensing an attitude of the sound-recording-apparatus main body, in which based on a sensing result of the opening and closing sensor and a sensing result of the attitude sensor, a stem sound-recording and a monophonic sound-recording are switched.

5 Claims, 6 Drawing Sheets

SOUND-RECORDING APPARATUS

CROSS REFERENCE OF RELATED APPLICATION

The disclosure of Japanese Patent Application No. 2008-268991, which was filed on Oct. 17, 2008, is incorporated herein by reference.

BACKGROUND OF THE INVENTION

1. Field of the Invention

The present invention relates to a sound-recording apparatus for sound-recording audio. More particularly, the present invention relates to a sound-recording apparatus capable of switching audio acquirers depending on a state of an apparatus main body.

2. Description of the Related Art

In recent years, it has become possible to witness a large number of IC recorders or multi-function electronic devices capable of switching between a stereo sound-recording and a monophonic sound-recording. Moreover, in order to resolve irksomeness resulting from manually switching between the stereo sound-recording and the monophonic sound-recording, it has also become possible to witness a sound-recording apparatus provided with a function of switching between the stereo sound-recording and the monophonic sound-recording depending on an attitude or orientation of the main body. However, there is a problem in that irrespective of the fact that a user does not desire to modify sound-recording system, switching of the sound-recording systems occurs due to carelessness of the user him/herself or a change in attitude or orientation of the sound-recording apparatus resulting from an unintended instance, etc., by the user.

According to one example of this type of apparatus, a monophonic microphone and two stereo microphones are placed on the same surface as that of an imaging device, a straight line linking the two stereo microphones and one of straight lines linking the monophonic microphone and the two stereo microphones are placed in a manner to be substantially perpendicular, and an attitude detector is provided. Thereby, a microphone used for the stereo sound-recording is selected depending on a detection result of the attitude detector.

However, when the above-described apparatus is used, it is not possible solve preceding problem.

SUMMARY OF THE INVENTION

A sound-recording apparatus according to the present invention comprises: a pair of first audio acquirers, each placed near both ends in a lengthwise direction, which acquires stereo audio; a second audio acquirer which acquires monophonic audio; a freely openable and closable supporter which holds an apparatus main body in a predetermined attitude; an opening and closing sensor which senses an opened and closed state of the supporter; and an attitude sensor which senses an attitude of the apparatus main body, in which when the apparatus main body is mounted on a mounting surface, if it is sensed by the opening and closing sensor that the supporter is in the opened state and also if it is sensed by the attitude sensor that the lengthwise direction of the apparatus main body is held in an attitude substantially horizontal relative to the mounting surface, the second audio acquirer is switched to the pair of first audio acquirers so as to acquire audio.

Preferably, there is a rectangular-shaped sound-recording apparatus in which a display portion which displays information about the apparatus main body is placed on a first surface that is the largest in area of an external surface of the apparatus main body, the pair of first audio acquirers are each placed near both ends in a lengthwise direction of a second surface that is the second largest in area of the external surface of the apparatus main body, the second audio acquirer is placed on a third surface that is the third largest in area of the external surface of the apparatus main body, and the supporter is placed on a surface opposite the first surface.

Preferably, comprised is a variable displayer which renders variable a display orientation of the information displayed on the display portion depending on the attitude of the apparatus main body.

The above described features and advantages of the present invention will become more apparent from the following detailed description of the embodiment when taken in conjunction with the accompanying drawings.

DETAILED DESCRIPTION OF THE PREFERRED EMBODIMENT

Hereinafter, an embodiment of the present invention will be described with reference to the drawings. It is noted that in the following description, first audio acquirers which stereophonically acquire audio are written as two "stereo microphones", a second audio acquirer which monophonically acquires audio is written as a "monophonic microphone", and a supporter which holds a sound-recording-apparatus main body in a predetermined attitude is written as a "stand". However, each of the stereo microphones and the monophonic microphone is just one example of an audio acquirer, and the stand is also just one example of a supporter.

(Configuration of Sound-Recording and Reproducing Apparatus 1)

Figure 1:
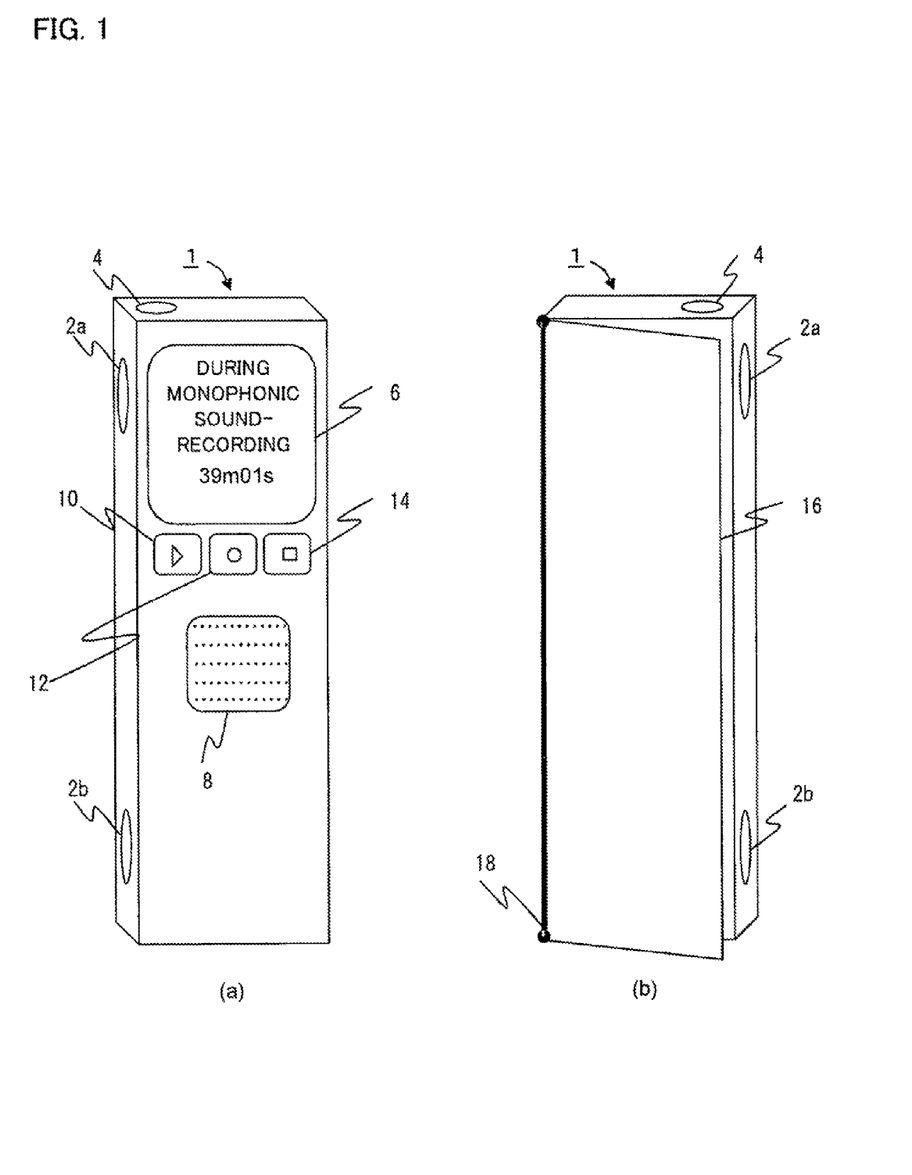
FIG. 1 is a schematic perspective view of a sound-recording and reproducing apparatus 1.

FIG. 1 is a schematic perspective view of a sound-recording and reproducing apparatus 1. FIG. 1(a) shows a front view of the sound-recording and reproducing apparatus 1, and FIG. 1(b) shows a rear view of the sound-recording and reproducing apparatus 1. The sound-recording and reproducing apparatus 1 is provided with stereo microphones 2a and 2b; a monophonic microphone 4; a display portion 6 for displaying information such as a sound-recording system and a sound-recording elapsed time period; a speaker 8 for outputting audio; a reproducing button 10; a sound-recording button 12; a stop button 14; and a stand 16 for holding the sound-recording and reproducing apparatus 1 in a predetermined attitude. The stereo microphones 2a and 2b may have the same microphone characteristic as that of the monophonic microphone 4.

On a surface of which the area is the largest, out of an external surface of the sound-recording and reproducing apparatus 1, the display portion 6, the speaker 8, the reproducing button 10, the sound-recording button 12, and the stop button 14 are placed. When the display portion 6 is placed on the surface of which the area is the largest, it becomes possible to make the size of the display portion 6 larger than when the display portion 6 is placed on other surfaces. Thus, it becomes easier to see. Moreover, near both ends in a lengthwise direction of a surface of which the area is the second largest, out of the external surface of the sound-recording and reproducing apparatus 1, the stereo microphones 2a and 2b are respectively placed. The placement like this enables audio sound-recording having a higher stereo effect. Furthermore, on a surface of which the area is the third largest, out of the external surface of the sound-recording and reproducing apparatus 1, the monophonic microphone 4 is placed. The placement like this facilitates orientation of the monophonic microphone 4 toward a sound source while the user grips the sound-recording and reproducing apparatus 1 like a microphone. On a surface opposing the surface on which the display portion 6 is placed, the stand 16 and a hinge portion 18 for communicating the stand 16 with the sound-recording-apparatus main body are placed.

Figure 2:
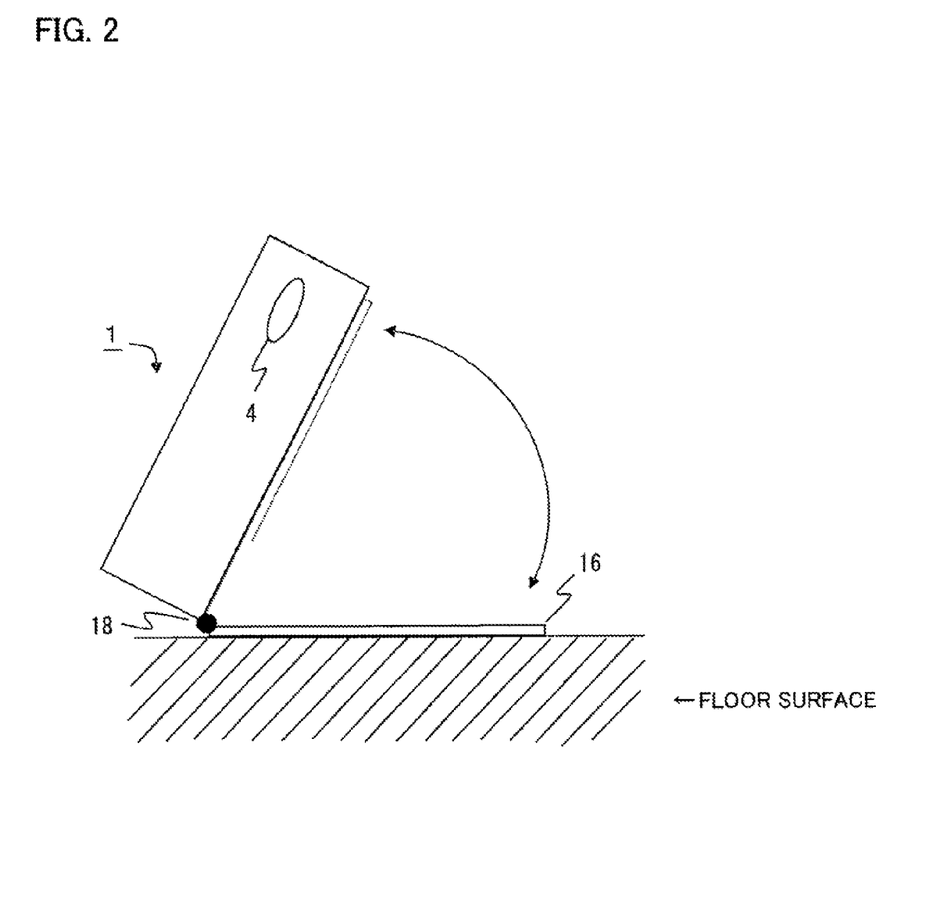
FIG. 2 is a schematic diagram showing an opening and closing operation of a supporter provided in the sound-recording and reproducing apparatus 1.

FIG. 2 is an image diagram when the stand 16 is hingedly opened. The stand 16 is freely opened and closed by using the hinge portion 18 as an axis, and when a hingedly opening amount of the stand 16 is adjusted, it becomes possible to hold the sound-recording and reproducing apparatus 1 in a desired attitude. Desirably, a hingedly openable angle is substantially 90 degrees. However, the stand 16 may be optionally configured to be hingedly opened at 90 degrees or more. Moreover, a latch may be optionally configured in the hinge portion 18 so as not to permit the hinge portion 18 to hingedly open at 90 degrees or more. The purpose of the stand 16 is to hold the attitude of the apparatus main body in a landscape state relative to a mounting surface at a time of the stereo sound-recording by using the sound-recording and reproducing apparatus 1. A gist of being "landscape" used herein is a state where a straight line linking the stereo microphones 2a and 2b is substantially horizontal relative to the mounting surface. When the above-described purpose is fulfilled, the stand 16 may be optionally placed or shaped as desired, other than described in this embodiment.

Figure 3:
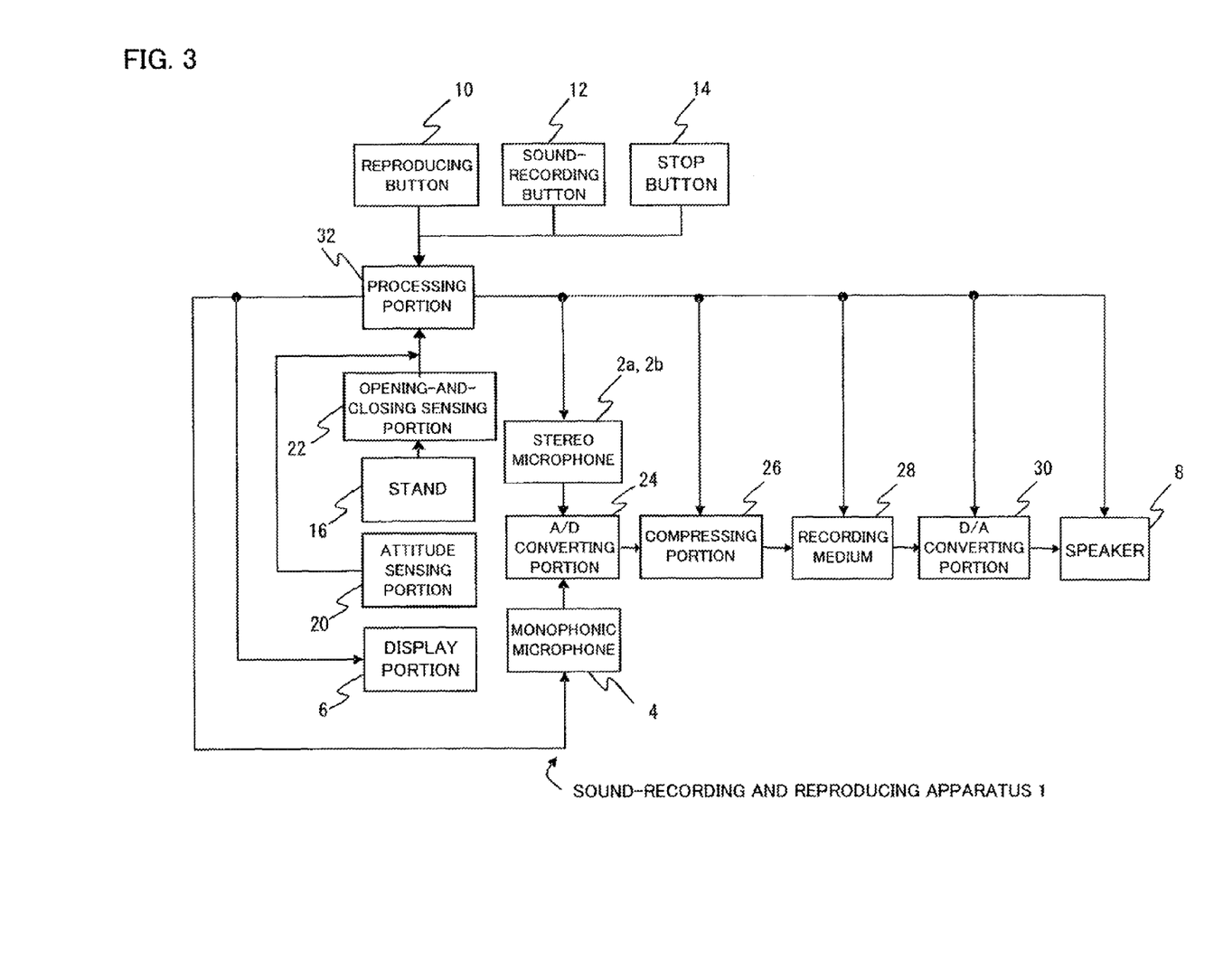
FIG. 3 is a schematic block diagram of the sound-recording and reproducing apparatus 1 shown in FIG. 1.

FIG. 3 is a block diagram showing an overview of the configuration of the sound-recording and reproducing apparatus 1. In addition to the components shown in FIG. 1, the sound-recording and reproducing apparatus 1 is provided with: an attitude sensing portion 20 for sensing an attitude of the sound-recording and reproducing apparatus 1; an opening-and-closing sensing portion 22 for sensing an opened and closed state of the stand 16; an A/D (Analog/Digital) converting portion 24 for converting an analog audio signal collected by the stereo microphones 2a and 2b or the monophonic microphone 4, into a digital audio signal, a compressing portion 26 for compression-converting the audio signal digitally converted by the A/D converting portion 24 into a desired file format such as a WAV (WAVE) format and an MP3 (MPEG Audio Layer-3) format; a recording medium 28 for recording the compression-processed audio signal; a D/A (Digital/Analog) converting portion 30 for converting the digital audio signal recorded in the recording medium 28, into an analog audio signal; and a processing portion 32 for performing processes such as switching between the stereo sound-recording and the monophonic sound-recording and modifying a display orientation of the display portion 6. The recording medium 28 is an internal memory or a detachable memory card, for example.

The sound-recording and reproducing apparatus 1 is provided with the altitude sensing portion 20 for sensing the attitude of the sound-recording-apparatus main body. This enables the sound-recording and reproducing apparatus 1 to determine what attitudes the apparatus main body is in. Attitude sensing is realized, for example, as follows: That is, a glass tube, in a sealed state, formed by being arcuately bent within the sound-recording and reproducing apparatus 1 is placed, and the attitude of the sound-recording apparatus is determined from a position of a mercury ball moving within the glass tube. Alternatively, it may be possible to adopt a technique for sensing the attitude of the sound-recording and reproducing apparatus 1, in which an acceleration sensor is placed within the sound-recording and reproducing apparatus 1 and an acceleration displacement is detected by the acceleration sensor.

The sound-recording and reproducing apparatus 1 is provided with the opening-and-closing sensing portion 22 for sensing opening and closing of the stand 16. This makes it possible to determine whether or not the stand 16 is in an opened state or in a closed state. Opening and closing sensing is realized, for example, as follows: That is, a rotary encoder for detecting a rotation transition is placed within the hinge portion 18, and an angle value outputted by the rotary encoder in a state where the stand 16 is closed is used as a reference value. In this state, when a difference between the outputted angle value and the reference value is equal to or more than a predetermined threshold value, it is sensed that the stand 16 is in an opened state and when the difference is equal to or less than the threshold value, it is sensed that the stand 16 is in a closed state.

The sound-recording and reproducing apparatus 1 is provided with a sound-recording system switcher for automatically switching between the stereo sound-recording and the monophonic sound-recording depending on the attitude or a state of the apparatus main body. This enables sound-recording suitable for a purpose of use or a scene even if confirming a sound-recording system or switching these systems at a time of sound-recording is not manually performed. The sound-recording system switcher is realized, for example, as follows: that is, when the attitude sensing portion 20 senses that the sound-recording and reproducing apparatus 1 is mounted on a floor surface in a landscape attitude and the opening-and-closing sensing portion 22 senses that the stand 16 is in an opened state, the processing portion 32 switches the sound-recording systems to the stereo sound-recording, and otherwise, switches to the monophonic sound-recording. A gist of being a "landscape attitude" used herein is, in other words, an attitude in which placement surfaces of the stereo microphones 2a and 2b face upward and a straight line linking between center portions of the stereo microphones 2a and 2b is substantially horizontal relative to the mounting surface. When a state of the stand 16 is used for switching the sound-recording systems, the sound-recording and reproducing apparatus 1 is disposed in a state where the stand 16 is opened at a time of the stereo sound-recording and the apparatus main body is held in a landscape attitude. This enables a decrease in possibility in which switching to a sound-recording system that a user does not intend occurs.

It is possible to manually switch the sound-recording systems. Moreover, the sound-recording system switcher may optionally be configured by ON/OFF means.

Figure 4:
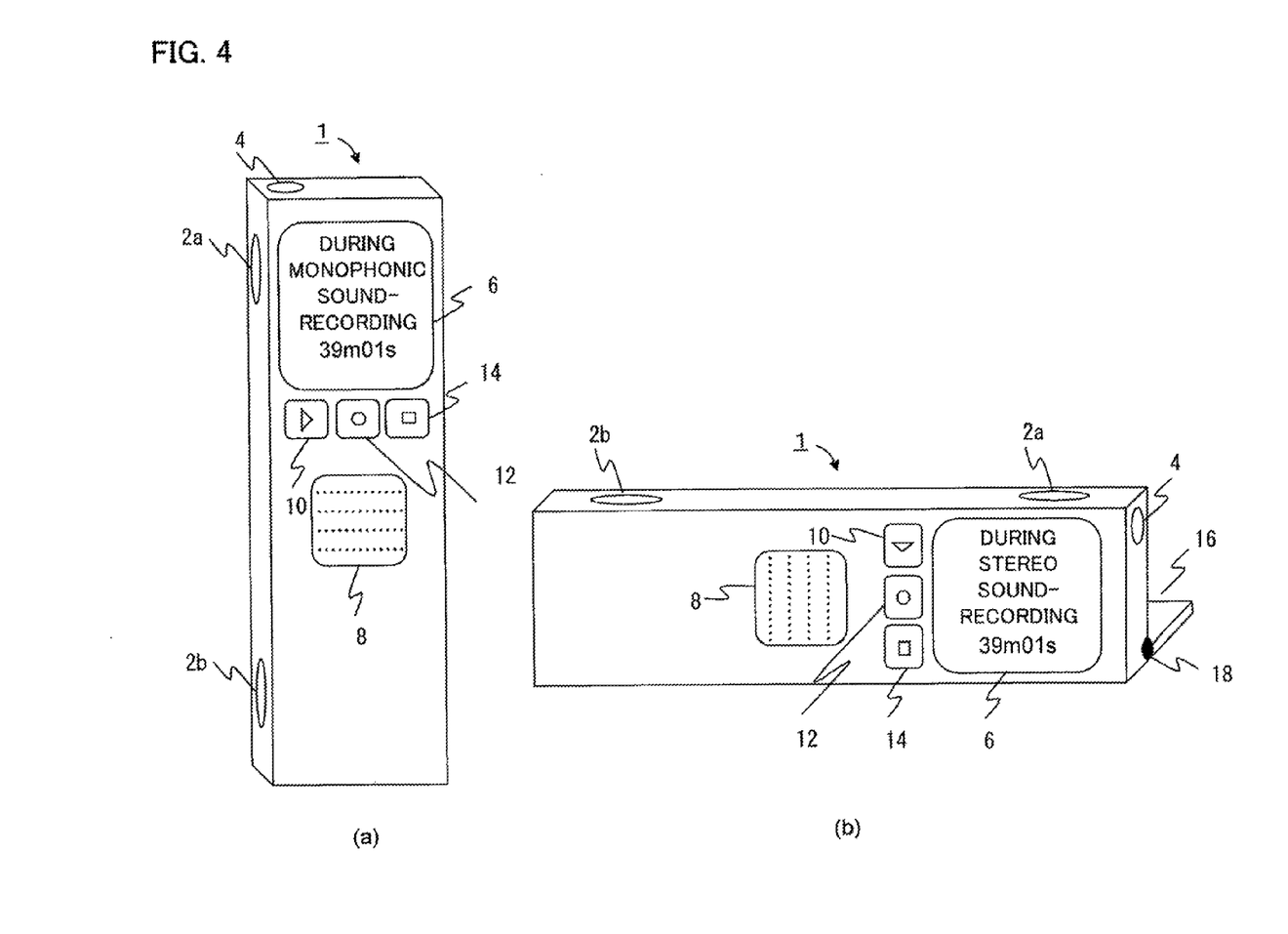
FIG. 4 is a schematic perspective view showing a variable display of a display portion 6 of the sound-recording and reproducing apparatus 1.

The sound-recording and reproducing apparatus 1 is provided with a variable displayer for switching depending on the attitude of the apparatus main body, a display orientation of information displayed on the display portion 6. FIG. 4(a) is a diagram showing the display orientation of the display portion 6 at a time of vertically installing the sound-recording and reproducing apparatus 1 on a floor surface, and FIG. 4(b) is a diagram showing the display orientation at a time of horizontally installing the sound-recording and reproducing apparatus 1 on the floor surface. On the display portion 6, information about the sound-recording apparatus such as a sound-recording system and a sound-recording time period is displayed during a sound-recording state, and information such as a date, a time, a day of a week, and a battery remaining amount is displayed during a non-sound-recording state. As shown in FIG. 4, the display orientation of the information displayed on the display portion 6 is varied depending on the attitude of the sound-recording and reproducing apparatus 1. It is possible to realize the variable displayer by using the attitude sensor.

(The Sound-Recording Operation of the Sound-Recording and Reproducing Apparatus 1)

Figure 5:
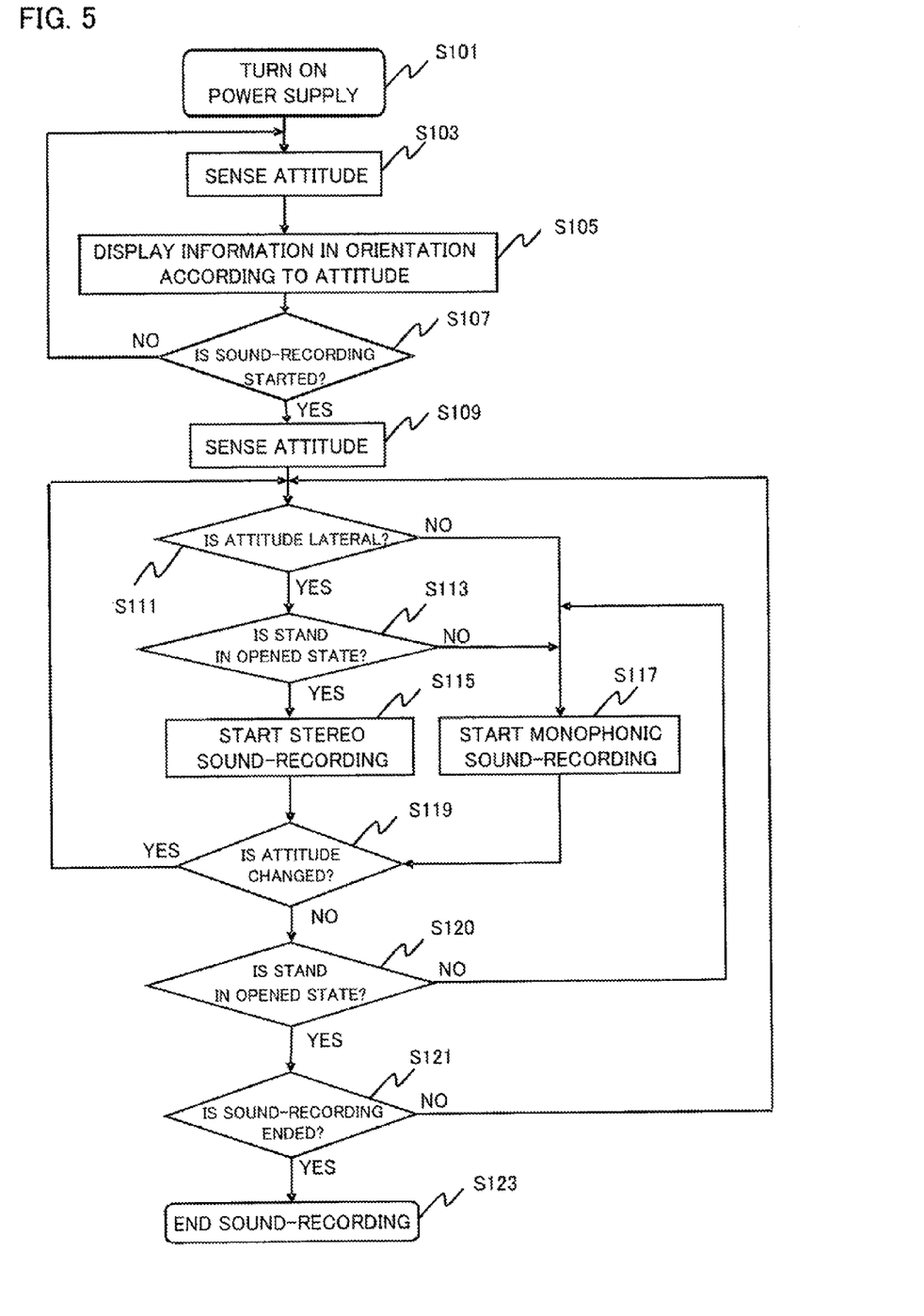
FIG. 5 is a flowchart showing a sound-recording operation of the sound-recording and reproducing apparatus 1.

With reference to FIG. 3 and FIG. 5, a sound-recording operation of the sound-recording and reproducing apparatus 1 will be described. FIG. 5 is a flowchart showing the sound-recording operation of the sound-recording and reproducing apparatus 1.

When a power supply of the sound-recording and reproducing apparatus 1 is turned on in a step S101, a sound-recordable state is established, and then, the process advances to a step S103.

In the step S103, sensing the attitude is performed by the attitude sensing portion 20. The attitude sensing portion 20 outputs the sensing result to the processing portion 32.

In a step S105, information such as a battery remaining amount and a remaining sound-recordable time period is displayed on the display portion 6. At this time, based on the sensing result outputted from the attitude sensing portion 20 in the step S103, the processing portion 32 performs a process so that the information is displayed in an orientation depending on the attitude.

In a step S107, it is determined whether or not sound-recording is started. When the sound-recording button 12 is manipulated, a sound-recording start signal is outputted to the processing portion 32, and the processing portion 32 outputs an instruction to start sound-recording, to the stereo microphones 2a and 2b or the monophonic microphone 4. In a case of starting sound-recording, the process advances to a step S109. Otherwise, the process returns to the step S103.

In the step S109, sensing the attitude is performed by the attitude sensing portion 20, and the sensing result is outputted to the processing portion 32.

In a step S111, based on the sensing result outputted from the attitude sensing portion 20 to the processing portion 32 in the step S109, it is determined whether or not the attitude of the main body is in a landscape attitude. As a result, when the attitude is in a landscape attitude, the process advances to a step S113. Otherwise, the process advances to a step S117.

In the step S113, it is determined by the opening-and-closing sensing portion 20 whether or not the stand 16 is in an opened state, and the determination result is outputted to the processing portion 32. When the stand 16 is in an opened state, the process advances to a step S115. Otherwise, the process advances to a step S117.

In the step S115, the stereo sound-recording is performed. From the processing portion 32, an instruction to start sound-recording is outputted to the stereo microphones 2a and 2b, the analog audio signal collected by the stereo microphones 2a and 2b is outputted to the A/D converting portion 24, and the analog audio signal is converted into the digital audio signal in the A/D converting portion 24. The digital audio signal is outputted to the compressing portion 26, the outputted signal is compression-converted into a file format desired by the user, such as a WAV format and an MP3 format, and the resultant signal is recorded in the recording medium 26. Then, the process advances to a step S119.

In the step S117, the monophonic sound-recording is performed. From the processing portion 32, an instruction to start sound-recording is outputted to the monophonic microphone 4, the analog audio signal collected by the monophonic microphone 4 is outputted to the A/D converting portion 24, and the analog audio signal is converted into the digital audio signal in the A/D converting portion 24. The digital audio signal is outputted to the compressing portion 26, the outputted signal is compression-converted into a file format desired by the user, such as a WAV format and an MP3 format, and the resultant signal is recorded in the recording medium 26. Then, the process advances to the step S119.

In the step S119, it is determined whether or not the attitude of the sound-recording and reproducing apparatus 1 is changed. When the attitude sensing portion 20 senses the attitude change, the process returns to the step S111, and when the attitude sensing portion 20 does not sense the attitude change, the process advances to a step S120.

In the step S120, it is determined by the opening-and-closing sensing portion 22 whether or not the stand 16 is in an opened state, and the determination result is outputted to the processing portion 32. When the stand 16 is in an opened state, the sound-recording is continued as it is. Otherwise, the process advances to a step S117.

In a step S121, it is selected whether or not to end the sound-recording. When the stop button 14 is manipulated, a sound-recording stop signal is outputted to the processing portion 32. The processing portion 32 outputs an instruction to stop sound-recording, to the stereo microphones 2a and 2b or the monophonic microphone 4. When the sound-recording is not ended, the sound-recording is continued as it is. Then, the process returns to the step S111.

In a step S123, the sound-recording is ended. When the stop button 14 is manipulated, the sound-recording stop signal is outputted to the processing portion 32, and the processing portion 32 outputs an instruction to end sound-recording, to the stereo microphones 2a and 2b or the monophonic microphone 4.

(A Reproducing Operation of the Sound-Recording and Reproducing Apparatus 1)

Figure 6:
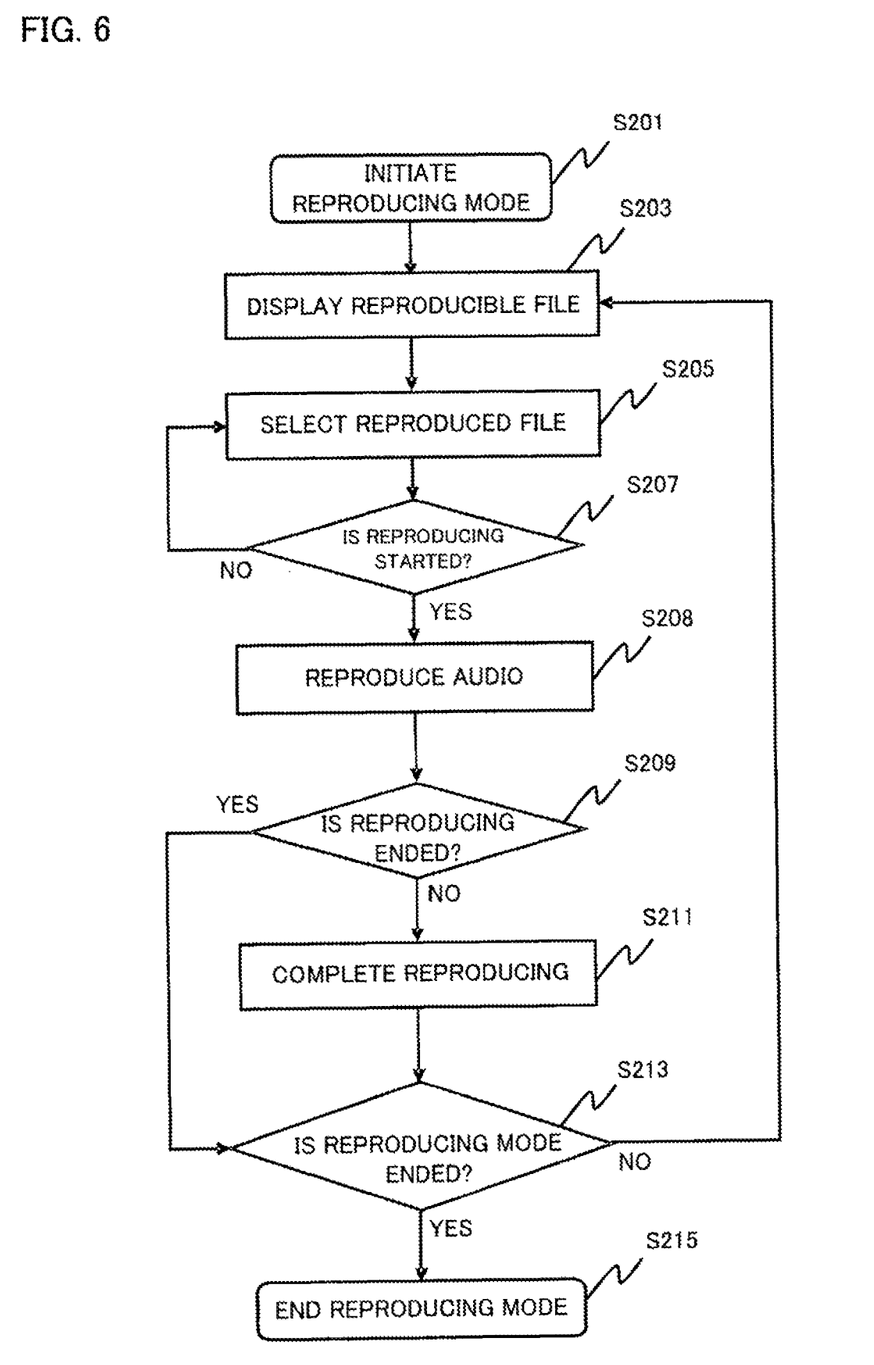
FIG. 6 is a flowchart showing a reproducing operation of the sound-recording and reproducing apparatus 1.

Subsequently, with reference to FIG. 3 and FIG. 6, a reproducing operation of the sound-recording and reproducing apparatus 1 will be described. FIG. 6 is a flowchart showing a reproducing operation of the sound-recording and reproducing apparatus 1.

In a step S201, when the power supply of the sound-recording and reproducing apparatus 1 is turned on so as to be set to a reproducing mode, the process advances to a step S203.

In the step S203, a list of names of reproducible audio files recorded in the recording medium 28 is displayed on the display portion 6. At that time, information about each audio file (such as a sound-recording date, a file size, and a reproducing time period) may be optionally displayed in combination.

In a step S205, an audio file to be reproduced is selected. On a front surface of the sound-recording and reproducing apparatus 1, a manipulation key (not shown) is placed, and when the user manipulates the manipulation key to select the audio file that is desired to be reproduced.

In a step S207, it is selected whether or not the audio file selected in the step S205 is reproduced. When the reproducing button 10 is manipulated, a reproducing start signal is outputted to the processing portion 32, and reproducing the audio file is executed. When the reproducing is executed, the process advances to a step S208, and when the reproducing is not executed, the process in the step S207 is repeated.

In the step S208, the audio is reproduced. The audio file selected to be reproduced in the step S207 is read out from the recording medium 28, and outputted to the D/A converting portion 30. The D/A converting portion 30 converts the outputted audio file from the digital audio signal into the analog audio signal, and outputs the same to the speaker 8. The speaker 8 outputs the analog audio signal outputted from the D/A converting portion 30.

In a step S209, it is selected whether or not to end reproducing the audio file. In a step S211, when the stop button 14 is manipulated, a reproducing stop signal is outputted to the processing portion 32, and reproducing the audio file is ended. In addition to the ending operation, interrupting/resuming of reproduction may be optionally enabled by placing a temporary stop button. When the reproducing the audio file is ended, the process advances to a step S215. Otherwise, the audio file that is being reproduced is reproduced until the end, and then, the process advances to the step S213.

In the step S213, it is selected whether or not to end the reproducing mode. When reproducing mode is ended, the process advances to a step S215. Otherwise, the process returns to the step S203.

In the step S215, the reproducing mode is ended.

The sound-recording and reproducing apparatus 1 according to this embodiment switches between the stereo sound-recording and the monophonic sound-recording depending on the opened and closed state of the stand 16 and the attitude of the main body. Thus, when the monophonic sound-recording is performed, the following usage is enabled: the user grips the sound-recording and reproducing apparatus 1 by hand and orients the monophonic microphone 4 toward a sound source. Furthermore, when the stereo sound-recording is performed, the stand 16 is opened so that the sound-recording and reproducing apparatus 1 is placed in landscape. Thereby, it becomes possible to sound-record in a more stable attitude. Moreover, the two stereo microphones are respectively placed at near both ends of the main-body lengthwise direction, and thus, it is possible to sound-record more highly realistically.

Also, in the embodiment, the sound-recording and reproducing apparatus is described. However, the present invention may be applied to an apparatus having a sound-recording function only.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sound-recording apparatus, comprising:
    a first and second audio acquirer which are respectively placed near both ends in a lengthwise direction of a main body, in order to acquire stereo audio;
    a third audio acquirer which is placed on said main body in order to acquire monophonic audio;
    a supporter supporting member which supports said main body and is able to turn around on an axis extending along the lengthwise direction of said main body;
    a first activator which activates said first and second audio acquirers when a predetermined condition satisfied; and
    a second activator which activates said third audio acquirer when a predetermined condition is unsatisfied, wherein
    the predetermined condition is a condition where an attitude of said main body is extends in a horizontal direction and an angle of said supporting member exceeds a reference angle.

2. A rectangular-shaped sound-recording apparatus according to claim 1, wherein
    a display portion which displays information about said main body is placed on a first surface that is the largest in area of an external surface of said main body,
    said first and second audio acquirer are respectively placed near both ends in a lengthwise direction of a second surface that is the second largest in area of the external surface of said main body,
    said third audio acquirer is placed on a third surface that is the third largest in area of the external surface of said main body, and
    said supporting member is placed on a surface opposite said first surface.

3. A sound-recording apparatus according to claim 2, further comprising a variable displayer which renders variable a display orientation of the information displayed on said display portion depending on the attitude of said main body.

4. A sound-recording apparatus according to claim 1, further comprising:
    a first sensor which senses an inclination of the axis to a vertical direction; and a second sensor which senses the turned angle of said supporting member.

5. A sound-recording apparatus according to claim 1, wherein each of said first activator and said second activator repeatedly determines whether or not the predetermined condition is satisfied.

* * * * *